(No Model.)
W. H. MITCHELL.
DIVIDERS OR COMPASSES.
No. 280,390. Patented July 3, 1883.
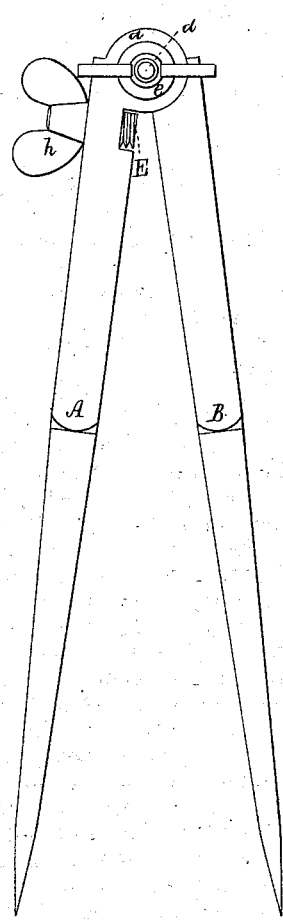
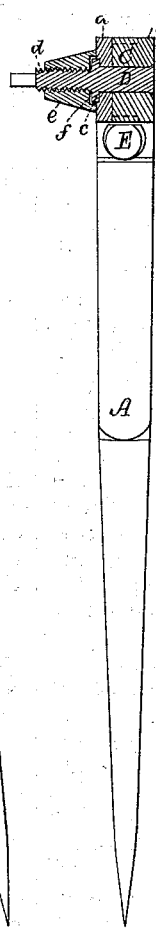
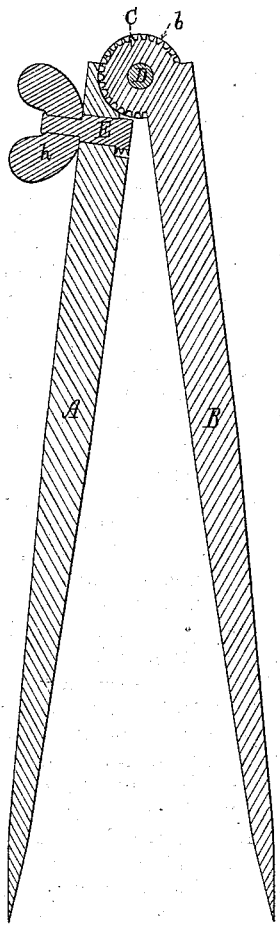
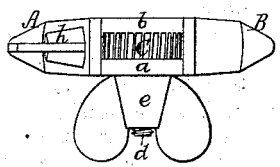
Witnesses.
S. N. Piper
E. P. Pratt
Inventor.
Wm. Holland Mitchell.
by R. H. Eddy atty.

UNITED STATES PATENT OFFICE.

WILLIAM H. MITCHELL, OF BOSTON, MASSACHUSETTS.

DIVIDERS OR COMPASSES.

SPECIFICATION forming part of Letters Patent No. 280,390, dated July 3, 1883.

Application filed November 20, 1882. (No model.)

*To all whom it may concern:*

Be it known that I, WILLIAM HOLLAND MITCHELL, of Boston, in the county of Suffolk, of the State of Massachusetts, have invented a new and useful Improvement in Dividers or Compasses; and I do hereby declare the same to be described in the following specification and represented in the accompanying drawings, of which—

Figure 1 is a front view, Fig. 2 a top view, Fig. 3 a longitudinal section, and Fig. 4 a transverse section, of a pair of compasses or dividers provided with my invention, whose nature is defined in the claims hereinafter presented, the object of it being the accurate and ready adjustment of the point of one leg in distance from that of the other. The remaining figures are hereinafter described.

In the drawings, A and B are the legs, which, formed as represented, are jointed together at their upper ends, each by having fixed to and projecting from it one of two circular segments, *a b*, and being suitably recessed to receive the segment fixed to the other leg.

Between the two segments and fastened to one of them, or in one piece with it, is a worm-gear, C, through which and the segment there is extended concentrically with them a pin or rivet, D, having a cylindrical head, *c*, from which there is projected in line with it (the said rivet) a screw, *d*. Screwed on the said screw *d* is a winged nut, *e*, which has within it a circular cavity, *f*, to receive the rivet-head, in order to enable the nut to bear against the next adjacent of the two segments. By hammering down the rivet at its outer end the necessary friction of the legs at the joint can be secured. In order to prevent the rivet from turning in the segment farthest from its head, the rivet, when on the head, may be prismatic, or, if cylindrical, may be secured by a pin driven partly into it and partly into the head. Furthermore, there is pivoted in the leg to which the worm-gear is not fastened a screw, E, provided with a winged head, *h*. This screw is a cylindrical segment, an end view of it being shown in Fig. 5 and a side view of it in Fig. 6, there being no threads on the chord of the segment, in order that when the said chord is next the worm-gear the screw shall be out of engagement therewith, such being so that the legs of the compass may be readily moved by hand either toward or from one another.

By revolving the screw transversely its threads may be caused to engage with the worm-gear C, and by continuing to so revolve the screw the accurate adjustment of the points of the legs from each other may be effected, their approximate adjustment being accomplished by hand when the screw is out of engagement with the worm-gear.

Having effected the requisite accurate adjustment of the legs, such may be preserved by screwing the winged nut hard up, so as to cause the segment next it to be borne against the worm-gear fastened to the other segment.

I am aware that draftsmen's or artificers' compasses have been provided with a screw to extend from one leg through a slot or hole in the opposite leg, such screw having a nut on it, and therefore I do not claim such.

I claim in compasses or dividers—

1. One leg provided at the joint of the two legs with a worm-gear extended from and fastened to it, (the said leg,) in combination with a segmental screw adapted to the other leg and to operate with the worm-gear substantially as set forth.

2. One leg provided with a worm-gear pivoted to and projecting from the joint-segment of such leg, and also with a joint pin or nut and a screw extended from it, as described, in combination not only with a nut applied to such screw and to act against the joint-segment of the other leg, but with a segmental screw adapted to the latter leg and to operate with such worm-gear substantially as set forth.

WILLIAM HOLLAND MITCHELL.

Witnesses:
R. H. EDDY,
E. B. PRATT.